(12) United States Patent
Cano et al.

(10) Patent No.: US 11,397,336 B2
(45) Date of Patent: Jul. 26, 2022

(54) OPHTHALMIC LENS INTEGRATING A DISORDERED ARRAY, TRANSPARENT ACTIVE MATRIX

(71) Applicant: Essilor International, Charenton le Pont (FR)

(72) Inventors: Jean-Paul Cano, Charenton (FR); Christian Bovet, Charenton (FR); Anthony Saugey, London (GB)

(73) Assignee: Essilor International, Charenton le Pont (FR)

( * ) Notice: Subject to any disclaimer, the term of this patent is extended or adjusted under 35 U.S.C. 154(b) by 538 days.

(21) Appl. No.: 16/097,393

(22) PCT Filed: Apr. 27, 2017

(86) PCT No.: PCT/FR2017/050997
§ 371 (c)(1),
(2) Date: Oct. 29, 2018

(87) PCT Pub. No.: WO2017/191393
PCT Pub. Date: Nov. 9, 2017

(65) Prior Publication Data
US 2019/0146244 A1  May 16, 2019

(30) Foreign Application Priority Data
May 3, 2016 (FR) ........................................ 1654021

(51) Int. Cl.
*G02C 7/00* (2006.01)
*G02C 7/08* (2006.01)
*G02F 1/1362* (2006.01)
*G02F 1/1343* (2006.01)
*G09G 3/36* (2006.01)
(Continued)

(52) U.S. Cl.
CPC .......... *G02C 7/083* (2013.01); *G02F 1/1362* (2013.01); *G02F 1/134309* (2013.01);
(Continued)

(58) Field of Classification Search
CPC .......... G02C 7/083; G02C 7/101; G02C 7/02; G02C 7/022; G02C 7/081;
(Continued)

(56) References Cited

U.S. PATENT DOCUMENTS

| 5,114,218 | A | 5/1992 | Black et al. | |
| 6,871,951 | B2 * | 3/2005 | Blum .................. | G02B 27/017 351/159.03 |

(Continued)

OTHER PUBLICATIONS

International Search Report dated Jun. 22, 2017, in PCT/FR2017/050997, filed Apr. 27, 2017.

*Primary Examiner* — Thomas K Pham
*Assistant Examiner* — Henry A Duong
(74) *Attorney, Agent, or Firm* — Oblon, McClelland, Maier & Neustadt, L.L.P.

(57) ABSTRACT

An ophthalmic lens including an active matrix including pixels, addressing rows serving to control the pixels, data columns serving to supply electrical power to pixels, and at least one transistor for each pixel. In the matrix of the ophthalmic lens: each row or column undulates continuously but non-periodically on either side of a theoretical straight addressing or data line connecting the two end terminals of the row or column.

14 Claims, 3 Drawing Sheets

(51) Int. Cl.
  *G09G 3/3208* (2016.01)
  *G02C 7/10* (2006.01)
(52) U.S. Cl.
  CPC ..... *G02F 1/136286* (2013.01); *G09G 3/3208* (2013.01); *G09G 3/3648* (2013.01); *G02C 7/101* (2013.01)
(58) Field of Classification Search
  CPC ......... G02F 1/136286; G02F 1/134309; G02F 1/1362; G09G 3/3648; G09G 3/3208
  USPC .................................... 351/159.39
  See application file for complete search history.

(56) References Cited

U.S. PATENT DOCUMENTS

| | | |
|---|---|---|
| 2005/0270481 A1 | 12/2005 | Blum et al. |
| 2007/0075627 A1* | 4/2007 | Kimura ............... H01L 27/3216 313/503 |
| 2008/0062112 A1* | 3/2008 | Umezaki ............. G02F 1/13452 345/100 |
| 2009/0284507 A1* | 11/2009 | Ito ........................ G09G 3/3648 345/207 |
| 2010/0208158 A1* | 8/2010 | Chen ................. G02F 1/133502 349/56 |
| 2011/0176074 A1 | 7/2011 | Ge et al. |
| 2014/0098308 A1* | 4/2014 | Wu ...................... H04N 13/305 349/15 |
| 2014/0172379 A1 | 6/2014 | Chang et al. |
| 2015/0092148 A1* | 4/2015 | Takano ................ G02F 1/1339 349/130 |

* cited by examiner

OPHTHALMIC LENS INTEGRATING A DISORDERED ARRAY, TRANSPARENT ACTIVE MATRIX

FIELD OF THE INVENTION

The present invention relates to a transparent active-matrix ophthalmic lens. An ophthalmic lens is a lens designed to be fitted in a spectacle frame with the aim of protecting an eye and/or correcting sight and may be a correcting or non-correcting ophthalmic lens (the latter type of lens also being called plano or afocal lenses). A correcting lens may be unifocal, bifocal, include a triple focal point or be a progressive lens.

PRIOR ART

A transparent active matrix array comprises, conventionally:
  pixels,
  address rows serving to control the pixels,
  data columns serving to supply the pixels with electrical power,
  for each pixel, at least one transistor connected to an address row and to a data column that are allocated to said pixel.

In known active-matrix lenses, the address rows and data columns are rectilinear and in two different (and parallel) planes, but form a regular, and generally square, mesh of a front surface of the lens. In all that follows, the terms "axial direction of the lens or of the matrix array" mean a direction orthogonal to this front surface.

Throughout the description, an optical component (such as an ophthalmic lens) is considered to be "transparent" when the observation of an image through this component is perceived without significant loss of contrast. In other words, the interposition of a transparent optical component between an image and an observer thereof does not significantly decrease the quality of the image.

A first loss of transparency in an active-matrix ophthalmic lens results from the use of opaque materials, i.e. materials that do not transmit light rays.

In order to obtain a transparent active matrix array, to produce the address rows and data columns a transparent conductive material such as ITO (acronym of Indium Tin Oxide) could be used, as is sometimes done for a passive matrix array.

This solution can be satisfactory only for active matrix arrays of small sizes because the transparent conductive materials known at the present time are not good enough conductors. Specifically, to compensate for the excessively high line losses, the width of the lines must be increased, this not being possible indefinitely. It is therefore necessary to limit the length of the lines and therefore the size of the matrix array in order to guarantee that power is correctly supplied to the end of the line.

It is therefore finally preferable to produce the address rows and data columns of the active matrix array of an ophthalmic lens from a conductive metal material (better conductor) such as copper, which material is not transparent. A first loss of transparency of the matrix array results therefrom, which may be limited by decreasing as much as possible the width of the rows and columns.

In the same way, the presence of the transistors increases the proportion of opaque area of the active matrix array. Technologies are known for producing transparent transistors but they are extremely high cost prices not compatible with an industrial production of optical components for everyday use such as ophthalmic lenses or display screens for example.

A second loss of transparency, in the sense of the term "transparent" given above, results from the macroscopic diffraction caused by the network of rows and columns of the active matrix array.

Specifically, each row or column possesses a limited width (parallel to a front surface of the ophthalmic lens) which engenders a microscopic diffraction of the light that reaches the active matrix array level with the row or column. The fractions of an incident light flux that are respectively diffracted by all the rows and columns are concentrated in certain isolated directions. A macroscopic diffraction results therefrom, consisting of a concentration of the light transmitted or reflected by the matrix array in certain directions: for a conventional active matrix array with a square network, the formation of a luminous cross appears in the transmitted or reflected beam.

The transistors also participate in this macroscopic diffraction effect.

SUBJECT OF THE INVENTION

The invention aims to mitigate these drawbacks and to provide an active-matrix ophthalmic lens having an improved transparency despite the presence of metal (and therefore opaque) rows and columns, i.e. an active-matrix ophthalmic lens in which macroscopic diffraction effects are significantly decreased, or even prevented, without substantially increasing the cost price of the ophthalmic lens with respect to known lenses, or degrading the performance of the active matrix array in particular in terms of response time.

To this end, the invention proposes an ophthalmic lens equipped with an active matrix array comprising:
  pixels,
  address rows serving to control the pixels, each address row extending between two opposite end terminals, without cutting another row or forming a loop, the address rows being made of a conductive metal material (chosen for its electrical conduction properties, but therefore opaque-nontransparent-),
  data columns serving to supply the pixels with electrical power, each data column extending between two opposite end terminals, without cutting another column or forming a loop, the data columns being made of a conductive (and therefore opaque) metal material,
  for each pixel, at least one transistor acting as a switch that allows an electrode (conductive area) specific to said pixel to be electrically connected to a data column, which switch is controlled via an address row thus associated with the pixel.

Conventionally, each pixel, just like the electrode that is specific thereto, is preferably bounded by a projection (onto the front face of the matrix) of two successive address rows and by a projection of two successive data columns, the transistor being located in a corner of the pixel.

However, the invention is not limited to this particular case: it also applies to the case of a matrix having pixels that are each connected to a row and a column that pass through said pixel, via a transistor that occupies a central position in the pixel.

Moreover, the address rows and the data columns may be in different planes and the address rows are in a different plane from that including the electrodes specific to the pixels, which may be the plane containing the data columns. Alternatively, the address rows and the data columns are mainly in the same plane, the rows or the columns being deviated into another plane level with each crossing between a row and column, so that the rows and columns do not cut one another. In the latter case, conductive projections may connect the rows and columns to the transistors.

The ophthalmic lens according to the invention is characterized in that:

each address row undulates continuously but non-periodically from one side to the other of a straight line, called the theoretical straight address line, connecting the two end terminals of said address row. In other words, each address row has one or more points of inflection between its end terminals. Although each address row may be curved over its entire length (between its two end terminals), the term "undulate" does not exclude the possibility that the address row (or the data column, such as defined below) might comprise one or more rectilinear segments, likewise, each data column undulates continuously but non-periodically from one side to the other of a straight line, called the theoretical straight data line, connecting the two end terminals of the data column.

Advantageously, the ophthalmic lens according to the invention also has one or more of the following features:

the amplitude in absolute value of the oscillations of each address row with respect to the corresponding theoretical straight address line is a pseudo-random or random variable having a three-sigma standard deviation lower than or equal to an average period of alternation of the theoretical straight address lines, and preferably lower than or equal to two thirds, to half, or even to one third of said average period of alternation of the theoretical straight address lines;

the average frequency of the oscillations of each address row, defined as the average of the spatial frequency spectrum of the address row, is comprised between $\frac{1}{10}^{th}$ and 10 times the average frequency at which the address rows cross the data columns; as explained above, the address rows and data columns are in different planes at least level with each "crossing" point between a row and a column, the terms "crossing" and "to cross" therefore do not mean that the rows and columns cut one another (which would cause a short circuit) but that they overlap without touching at their crossing points;

the amplitude in absolute value of the oscillations of each data column with respect to the corresponding theoretical straight data line is a random variable having a three-sigma standard deviation lower than or equal to an average period of alternation of the theoretical straight data lines, and preferably lower than or equal to two thirds, to half, or even to one third of said average period of alternation of the theoretical straight data lines;

the average frequency of the oscillations of each data column is comprised between $\frac{1}{10}^{th}$ and 10 times the average frequency at which the data columns cross the address rows;

it being specified that:

the average period of alternation of the theoretical straight address lines is an average, for example an arithmetic mean or optionally a geometric mean, of the spacing between the theoretical straight address lines; it is in particular a question of the (arithmetic for example) mean of the spacing between two successive end terminals of the address rows on one (or other) side of the matrix array, in the case of parallel theoretical straight address lines;

likewise, the average period of alternation of the data columns is an average, for example an arithmetic mean, of the spacing between the theoretical straight data lines (spacing that may for example be measured level with the end terminals, indifferently on one or other side of the matrix array, if the theoretical straight data lines are parallel).

Figure 3:
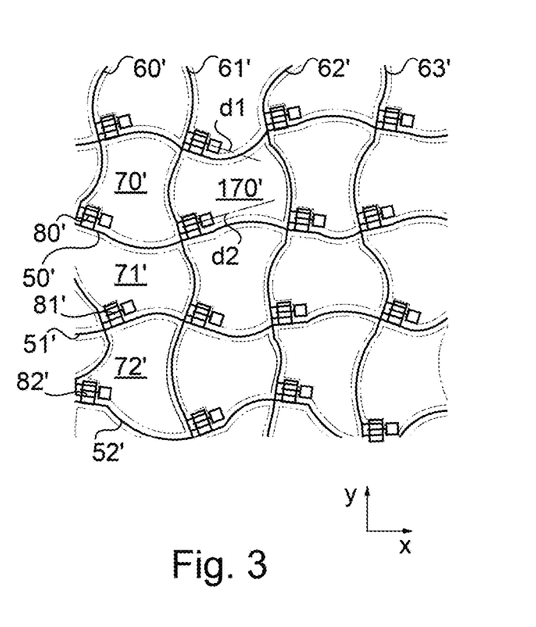
FIG. 3 is a schematic top view of an active matrix array according to the invention, obtained, using a method according to the invention, by deforming the regular matrix-array structure of FIG. 2.

The invention thus makes provision to introduce disorder into a regular starting structure, so as to distribute as uniformly as possible the diffraction directions and to obtain an active matrix array having a deformed and irregular structure limiting coherent interference effects in the diffraction, such as the deformed matrix illustrated in FIG. 3. The disorder is introduced via a non-periodic undulation of the address rows and/or data columns.

Thus, the impact of the diffraction on the image transmitted by an optical component comprising this deformed and irregular structure will be distributed uniformly over the entire area of the optical component. In other words, the relative distribution of the intensities transmitted by this optical component will be unchanged.

In particular, for the ophthalmic field, such a disorder leads to a lens having, in transmission, a haze (such as defined in standard ASTM D1003) that is uniform over its entire area.

In addition, the amplitude of the undulations may be made random in order to increase the disorder.

Advantageously and according to the invention, the average line of each address row is the corresponding theoretical straight address line; this meaning that the address line is "vertically" centered on the theoretical straight address line. This feature, combined with an amplitude having a three-sigma standard deviation that is limited as indicated above with respect to the average period of alternation of the address rows, allows the probability, during the design of the matrix array, that two successive address rows cross or touch to be considerably decreased, thus limiting the probability of designing a system running a risk of a short-circuit between two rows.

Nevertheless, in the case of a Gaussian distribution of the amplitude of the oscillations of the address rows, the probability of collision of two address rows cannot be completely zero. In one embodiment of a method for designing a matrix array according to the invention, provision may be made for a step of checking for the potential presence of points of intersection or of contact between two successive address rows, two successive data columns, respectively, and a step of removing said points of intersection or of contact, including, where appropriate, a local modification of the shape of one, or other, or of both, of the address rows, of the data columns, respectively, in question.

According to another embodiment, the distribution function of the amplitude of the oscillations is limited amplitudewise. For example, the amplitude in absolute value of the oscillations of each address row with respect to its theoretical straight address line is lower than or equal to the average period of alternation of the address rows.

Analogously, the average line of each data column is preferably the corresponding theoretical straight data line (in other words, the data column is "horizontally" centered on its theoretical straight data line). The observations made and variants given above with respect to the address rows apply mutatis mutandis to the data columns.

Moreover, the average frequency of the undulations may be differentiated from the frequency at which the address rows and data columns cross, thus contributing to adding disorder in the position of the crossings by forming a network devoid of long-distance order.

The average frequency of the undulations is typically comprised between $1/10^{th}$ and 10 times, and preferably between $1/5^{th}$ and 5 times, the average frequency at which the data columns cross the address rows.

In one particular embodiment, the average frequency of the undulations and the average frequency at which the data columns cross the address rows are not commensurable. Thus, there is no periodic repetition of the location of the nodes of the network and the diffracted light is distributed more uniformly over the area of the lens.

Advantageously and according to the invention, the active matrix array also possesses the following feature: the nodes of the active matrix array form a pseudo-random or random network, it being specified that the term "node" means, as is conventional, a point at which an address row and a data column cross, i.e. a point of intersection between said address row and a projection of said data column onto the plane containing the address rows. In other words, there is no long-distance order in the matrix array.

It will be noted that the nodes are, preferably, marked by the presence of a transistor. The transistor generally makes electrical contact with the address row via its gate, and with the data column via one of its, source or drain, electrodes.

In one possible embodiment, at least one address row or data column includes a succession of circular arcs. In this succession, at the junction between two circular arcs, the tangents are preferably coincident.

In one possible embodiment of the invention, the theoretical straight address lines are parallel to one another.

In one possible embodiment of the invention, the theoretical straight data lines are parallel to one another.

In one embodiment of the invention, the area of the pixels on the front face, i.e. the area of the electrode specific to said pixels, varies with a standard deviation lower than or equal to 10%, preferably lower than or equal to 5%, or even lower than or equal to 2%, from one pixel to the next. The primary capacitance of a pixel being proportional to its area, a low standard deviation in the distribution of the areas (as defined above) results in a low standard deviation in the distribution of the primary capacitances of the pixels, guaranteeing a quasi-uniformity in the response of the pixels.

In one possible embodiment, the active matrix array includes storage capacitance rows providing the pixels with secondary capacitances. To each address row there then corresponds a storage capacitance row that, according to the invention, follows the oscillations of said address row. Each pixel then has a secondary capacitance proportional to the area of the section, here called the unitary section, of the storage capacitance row lying facing (in the axial direction) said pixel, i.e. lying between the projections of the two successive data columns that bound said pixel.

In a preferred version of this embodiment, the storage capacitance rows are designed so that the secondary capacitances of the pixels compensate for variations in area (and therefore in primary capacitance) between pixels. This allows the system to be stabilized, in particular frequency-wise. The area of each unitary section of storage capacitance row is therefore adjusted so that the pixels have a total capacitance (primary capacitance+secondary capacitance) that varies little from one pixel to the next (for example that varies with a standard deviation lower than or equal to 10%, preferably lower than or equal to 5%, or even lower than or equal to 2%).

This adjustment may be obtained by making the width of each unitary section of storage capacitance row vary from one pixel to the next (depending on the length of said unitary section, which is determined from the location of the nodes of the matrix array, which themselves preferably have a given disorder as explained above).

In the case of an ophthalmic lens equipped with a matrix array according to the invention not having the aforementioned specificities regarding the primary capacitances, or the area of the pixels, and the secondary capacitances, it remains however possible to obtain a uniform pixel response by controlling the way in which the pixels are driven, for example by means of a table of compensation of the grey-scale levels for each pixel.

As indicated in the introduction, each pixel comprises one or more transistors for driving it. A transistor usually has an overall parallelepipedal shape with a longitudinal direction corresponding to its largest length parallel to the front face of the matrix array. In one preferred embodiment of the invention, the transistors of the active matrix array have pseudo-random or random longitudinal directions. The various edges of the transistors are then oriented in different directions from those of the corresponding edges of the neighboring transistors, this allowing the macroscopic diffraction caused by the transistors and in particular by the edges of said transistors to be limited. This therefore improves the transparency of the active matrix array.

In another embodiment of the invention, the active matrix array in addition comprises a shield for each transistor. The shields are opaque and thus protect the transistors from light interference; they mask the edges, preventing macroscopic diffraction by said edges, replacing it with a diffraction related to the shield, which is more easily accommodable.

According to a first version, the shields have a circular or approximately circular shape, so that the scattering of the light rays level with the shields, i.e. level with the transistors, does not occur in a specific privileged direction but in every direction. The scattering of light is distributed in every direction uniformly if the shield is perfectly circular. The macroscopic diffraction related to the transistors is then decreased, thus limiting the loss of transparency of the matrix array by diffraction due to the shields and transistors.

According to a second version, the shields are adjusted to the transistors, i.e. they have a shape and dimensions (seen from the front face of the matrix array) that are similar to the transistors, and the shields and transistors have longitudinal directions (direction along the largest dimension of the shield) that are random or pseudo-random. Specifically, the use of shields of disc shape despite the fact that the transistors have polygonal cross sections, leads to a loss of transparency of the matrix array via an increase in the area of opaque material of the matrix array. It may therefore be advantageous to decrease the area hidden by the shields by making them a shape other than a disc shape and, in this case, to make provision to pseudo-randomly or randomly orient said shields (and transistors).

Moreover, according to another embodiment, the shields of the transistors may be of different shape from one transistor to the next, or even be of random outline.

Preferably, the longitudinal direction of each transistor and/or its shield makes a pseudo-random or random angle comprised between −22.5° and +22.5° to the theoretical straight address line of the address row to which the transistor is connected. The inventors have identified that this angular limit allows a sufficient amount of disorder to be created in the orientation of the transistors to obtain a satisfactory improvement in the transparency of the matrix array by decreasing diffraction, whereas larger angles make the production of the matrix array too difficult.

In one possible embodiment of the invention, the active matrix array in addition comprises, in a known way, a shadow mask for each address row and/or data column, and/or for each storage capacitance row (when the latter are present). Such shadow masks increase the area of opaque material that the matrix array contains but limit the losses of modulation in phase or in index, the latter advantage possibly proving to be greater than the aforementioned drawback.

Preferably, the shadow mask covers every part of the active matrix array that does not modulate the phase of the light, i.e. that is not facing an electrode of a pixel. This in particular concerns the zones between the pixels, i.e. between the address rows, the data columns, respectively, and the electrodes of the pixels.

In one embodiment of the invention, at least certain of the shadow masks have an outline that is undulated, for example pseudo-randomly or randomly, with respect to the address row or data column or storage capacitance row that it masks.

In one possible embodiment of the invention, the pixels contain substances of different refractive indices.

In one possible embodiment of the invention, each pixel is closed by walls. Alternatively, for a matrix array devoid of walls, a pixel is the volume bounded by the conductive area specific to the pixel (electrode of the pixel) and connected to an electrode of the transistor other than the electrode connected to the data column and the electrode connected to the address row that are allocated to the pixel.

In particular, the pixels may include an active solution comprised between two electrodes. At least one of the two electrodes has an area that is specific to a pixel. The other electrode may have the same area as the area specific to the pixel or may be common to a plurality of pixels, or even to all the pixels. In certain applications the active solution does not make direct electrical contact with the electrodes and may be separated from the electrodes by electrical insulators; for other applications, the active solution makes electrical contact with the electrodes.

The active solution comprises an active element that may be an electrochemical element, a solution of liquid crystals, or other elements influenced by a voltage applied across the two electrodes of the pixel.

The active matrix array of a lens according to the invention may be formed directly on a face of a transparent rigid substrate, which face may be convex, concave or planar. The matrix array may, as a variant, be formed on a face of a transparent supple film that is then added, and for example adhesively bonded, to a transparent rigid substrate.

The invention covers an active-matrix ophthalmic lens characterized in combination by all or some of the features mentioned above and below.

The invention also proposes a method for designing an active matrix array according to the invention for an ophthalmic lens. This method comprises the following steps, which are executed in the order in which they are defined:

selecting a regular digital matrix-array structure comprising substantially parallel straight address lines that are separated from one another with a substantially constant vertical period, and substantially parallel straight data lines that are separated from one another with a substantially constant horizontal period, the terms "digital matrix-array structure" mean a digital representation of a matrix-array structure; the straight address lines being parallel to one another, just like the straight data lines, the selected regular digital matrix-array structure is a matrix array of polygonal unit cells; if the straight data lines are in addition orthogonal to the straight address lines, the selected digital matrix-array structure is a matrix array of square or rectangular unit cells;

deforming the initially selected regular digital matrix-array structure in order to introduce disorder and to distribute, preferably uniformly, the diffraction directions. At the end of this step, a deformed digital matrix array (i.e. a digital representation of a deformed matrix array) is obtained.

In one embodiment according to the invention, this deforming step is carried out by defining an address row on the basis of each initial straight address line of the regular digital matrix-array structure selected beforehand and a data column on the basis of each initial straight data line of the regular digital matrix-array structure, such that:

each address row undulates continuously but non-periodically from one side to the other of the corresponding initial straight address line (it will be noted that the straight address lines of the initial regular digital matrix-array structure correspond to the theoretical straight address lines defined above).

each data column undulates continuously but non-periodically from one side to the other of the initial straight data line (it will be noted that the straight data lines of the initial regular matrix-array structure correspond to the theoretical straight data lines defined above).

Provision may also be made for:

the amplitude in absolute value of the oscillations of each address row with respect to the corresponding initial straight address line (of the regular matrix-array structure) to be a random variable having a three-sigma standard deviation lower than or equal to an average period of alternation—such as defined above—of the initial straight address lines, and preferably lower than or equal to two thirds, to half, or even to one third of said average period of alternation of the initial straight address lines, the average frequency of the oscillations of each address row, defined as the average of the spatial frequency spectrum of the address row, to be comprised between $\frac{1}{10}$th and 10 times the average frequency at which the address rows cross the data columns;

the amplitude in absolute value of the oscillations of each data column with respect to the corresponding initial straight data line to be a random variable having a three-sigma standard deviation lower than or equal to an average period of alternation (such as defined above) of the initial straight data lines, and preferably lower than or equal to two thirds, to half, or even to one third of said average period of alternation of the initial straight data lines, the average frequency of the oscillations of each data column, defined as the average of the spatial frequency spectrum of the data column, to be comprised between $\frac{1}{10}$th and 10 times the average frequency at which the data columns cross the address rows.

Below, the terms "unitary segment of straight address line" mean a segment of straight address line bounded by two successive nodes of the initial regular digital matrix-array structure that are located on said straight address line, in other words a segment of straight address line bounded by two successive straight data lines of the initial regular digital matrix-array structure. Analogously, the terms "unitary segment of straight data line" mean a segment of straight data line bounded by two successive nodes of the initial regular digital matrix-array structure that are located on said straight data line, in other words a segment of straight data line bounded by two successive straight address lines of the initial regular digital matrix-array structure.

In one embodiment of the invention, the deforming step comprises replacing each unitary segment of straight address line with a circular arc or with a succession of circular arcs and replacing each unitary segment of straight data line with a circular arc or with a succession of circular arcs. The obtained matrix array is then qualified an undulated digital matrix array.

This preferred embodiment does not exclude the possibility, in one variant that is less advantageous but still according to the invention, of preserving a few rectilinear unitary segments of straight address lines or of straight data lines, in the deformed digital matrix array.

In another embodiment of the invention, which may be combined with the preceding embodiment, the deforming step comprises moving each node of the initial regular digital matrix-array structure. The obtained matrix array is then qualified an irregular digital matrix array.

Advantageously, the nodes are moved in movement directions that are chosen pseudo-randomly or randomly.

Preferably, the nodes are moved so that the Euclidean distance between two directly neighboring nodes on a given address row, or a given data column, respectively, is a random variable the standard deviation of which is comprised between 10% and 40%, and preferably between 20% and 30%, of the average distance between two directly neighboring nodes of said row or column.

In the case of the combination of this embodiment (with pseudo-random or random movement of the nodes) with the preceding embodiment (with replacement of segments of straight line between nodes with circular arcs or successions of circular arcs), the two deforming steps may be carried out in one or other order. It is possible for example to initially move the nodes so as to obtain an irregular digital matrix array, then to link each node to its direct neighbors (only the neighboring nodes to which said node was already linked in the initial regular digital matrix-array structure) with a circular arc or a plurality of circular arcs in succession, as explained above, thus forming an undulated digital matrix array on the basis of the nodes of the preceding irregular digital matrix array, or, conversely, to form an irregular matrix array by moving the nodes of an undulated matrix array formed beforehand.

In one embodiment of the designing method according to the invention, the method in addition comprises one or more of the following features:

it comprises an additional step of creating disorder in the orientation of the transistors, in which directions are defined pseudo-randomly or randomly and assigned to each node of the deformed digital matrix array, in order to correspond to a longitudinal direction of a transistor then positioned at said node, in the step of creating disorder in the orientation of the transistors, the longitudinal directions of the transistors are defined pseudo-randomly or randomly such that each longitudinal direction makes an angle comprised between −22.5° and 22.5° to the initial straight address line passing through the node to which the longitudinal direction is assigned, in order to guarantee that the active matrix array is easy to produce, the method comprises an additional step of optimizing primary capacitances, for example comprising a step of calculating the area of each of the unit cells of the deformed digital matrix array and a step of adjusting the position of the nodes so that the area of the unit cells of the deformed digital matrix array varies with a standard deviation lower than or equal to 10%, preferably lower than or equal to 5%, preferably 2%, or even 1%;

the additional step of optimizing the primary capacitances uses an optimization algorithm of gradient-descent type;

the method comprises an additional step of optimizing secondary capacitances, each address row of the deformed digital matrix array being doubled by a storage capacitance row that follows the same oscillations. This additional step of optimizing the secondary capacitances comprises calculating the area of the unitary segments of storage capacitance row, a unitary segment being bounded by two successive data columns, and adjusting the width of each unitary segment of storage capacitance row so that the area of said segments varies with a standard deviation that is lower than or equal to 10%, preferably lower than or equal to 5%, or even 2%. As a variant, all the unitary segments of storage capacitance row are replaced by a given segment, of preset single length and width. It will be noted that throughout the description, the expression "length of a segment" is understood to mean, as it is conventional, the dimension of the latter measured along the curve of said segment from one end to the other of the segment (it is therefore not the Euclidean distance between the two ends of the segment).

BRIEF DESCRIPTION OF THE DRAWINGS

Other details and advantages of the present invention will become apparent on reading the following description, which refers to the appended schematic drawings and relates to embodiments of the invention, which embodiments are provided by way of nonlimiting example and may be combined. In these figures.

DETAILED DESCRIPTION OF EXEMPLARY EMBODIMENTS

Throughout the description the terms "unitary segment" mean a segment of line between two consecutive nodes of the matrix array, irrespectively of whether the line in question is an address row, or a data column or a secondary capacitance row, or indeed whether it is curved or straight.

Figure 1:
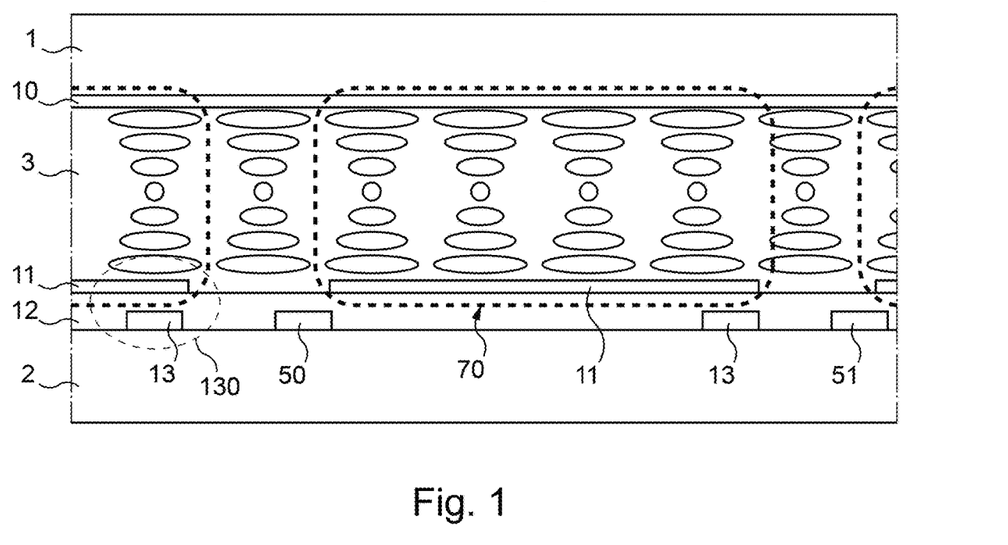
FIG. 1 is a schematic transverse cross-sectional view of a portion of a conventional liquid-crystal active matrix array.

FIG. 1 illustrates a liquid-crystal matrix array comprising a first glass layer 1 and a second glass layer 2 successively enclosing a first ITO electrode 10 (which covers the entire area of the first glass layer 1), a liquid-crystal layer 3, second ITO electrodes 11 of square area and an insulating layer 12 made of SiN. By way of example and approximately, the thickness of each glass layer 1, 2 is 1 mm, the thickness of the first ITO electrode 10 and of the second ITO electrodes 11 is 100 nm, the thickness of the insulating layer 12 is 400 nm and the liquid-crystal layer 3 has a thickness of 4.5 µm. For the sake of clarity, the appended figures are not to scale, the smallest elements being enlarged with respect to others in order to make the figures easier to read.

Figure 2:
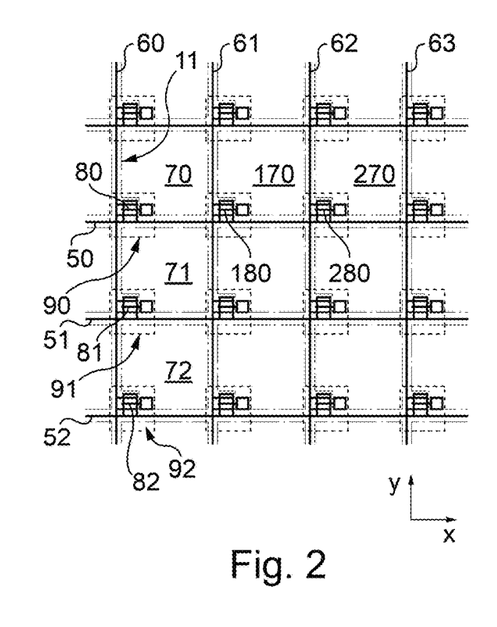
FIG. 2 is a schematic top view of a first example of a conventional regular matrix-array structure of an active matrix array of square unit cell.

Each second ITO electrode 11 lies between two consecutive address rows 50, 51 in the X direction and between two consecutive data columns 60, 61 in the Y direction (see for example FIG. 2, the data columns not appearing in the cross section of FIG. 1). The whole of the cell lying between two address rows 50, 51 and between two data columns 60, 61 is a pixel 70, the frontal dimensions in X and Y of which are those of the corresponding second ITO electrode 11. The first ITO electrode 10 is common to all of the pixels of the active matrix array, whereas each second ITO electrode 11 is specific to one pixel. The ITO electrodes 10, 11 form a capacitor (the intermediate crystal 3 being insulating) that has a capacitance that is here called the primary capacitance of the pixel, this capacitance also been known as the "pixel capacitance" or the "liquid-crystal capacitance".

A secondary capacitance 130 is formed, for each pixel, between the second ITO electrode 11 and a storage capacitance row 13. In a conventional active matrix array, each storage capacitance row 13 is a continuous straight line of constant width, parallel to the straight address lines 50, 51. In a deformed matrix array according to the invention, each storage capacitance row is a continuous or discontinuous curved row that follows the same oscillations as the address row 50' of the corresponding pixel and that may be of width that is variable (from one pixel to the next) as explained below.

An active matrix array such as that shown in cross section in FIG. 1 may for example be found in a display screen. Known screens all possess a regular matrix-array structure, for example a matrix-array structure with square unit cells, such as the structure illustrated in FIG. 2. The address rows 50-52 . . . of such a regular structure are parallel straight lines. Likewise, the data columns 60-63 . . . are parallel straight lines. Each pixel 70, 71, 72, 170, 270 . . . , of each corresponding ITO electrode 11 is therefore square (seen from above), without taking into account the corner truncated by the transistor that serves to control it.

Each pixel 70, 71, 72, . . . is controlled by a transistor 80, 81, 82 . . . that is arranged in a corner of the pixel and connected to an address row 50, 51, 52 . . . (gate- or base-side of the transistor) and to a data column 60 (source- or emitter-side of the transistor). With each pixel are thus associated an address row and a data column via the corresponding transistor. The transistor acts as a switch: when a current is flowing through an address row 50 (switches 80, 180, 280 . . . in the closed position), the pixels 70, 170, 270 . . . controlled by this address row are supplied with the current flowing through their respective data column 60, 61, 62, . . . . When no current is flowing through the address row 50 (switches 80, 180, 280 . . . in opened position), the pixels controlled by this row (pixels 70, 170, 270 . . . ) receive no current and are therefore turned off or inactive.

Thus, address rows 50', 51', 52' and data columns 60', 61', 62' delimit pixels 70', 71', 72', 170' . . . which are not squared.

The invention makes provision to introduce disorder into a regular starting structure, so as to distribute as uniformly as possible the diffraction directions and to obtain an active matrix array having a deformed and irregular structure limiting coherent interference effects in the diffraction, such as the deformed matrix illustrated in FIG. 3.

The deformed matrix array of FIG. 3, which is according to the invention and which may advantageously be constructed from the regular matrix-array structure of FIG. 2, comprises address rows 50', 51', 52' formed by a succession of circular arcs. Each address row 50', 51', 52' undulates from one side to the other of a theoretical straight address line linking two address terminals (not shown), i.e. linking the two ends of the initial address row of the regular matrix array. The theoretical straight address line in the sense of the appended claims corresponds to the address row 50, 51, 52 of the initial regular structure.

Analogously, the active matrix array comprises data columns 60', 61', 62' that are not rectilinear and that are formed by successions of circular arcs. Each data column 60', 61', 62' thus undulates from one side to the other of a theoretical straight data line corresponding to the column 60, 61, 62 of the initial regular matrix-array structure.

Moreover, in one embodiment, the transistors 80', 81', 82' have longitudinal directions $d_1$, $d_2$ . . . that differ from one another, at least as regards nearest-neighbor transistors. In particular, the longitudinal directions do not have short-distance and medium-distance order, and preferably do not have long-distance order, in order to also limit coherent interference of the rays diffracted by the transistors.

Figure 8:
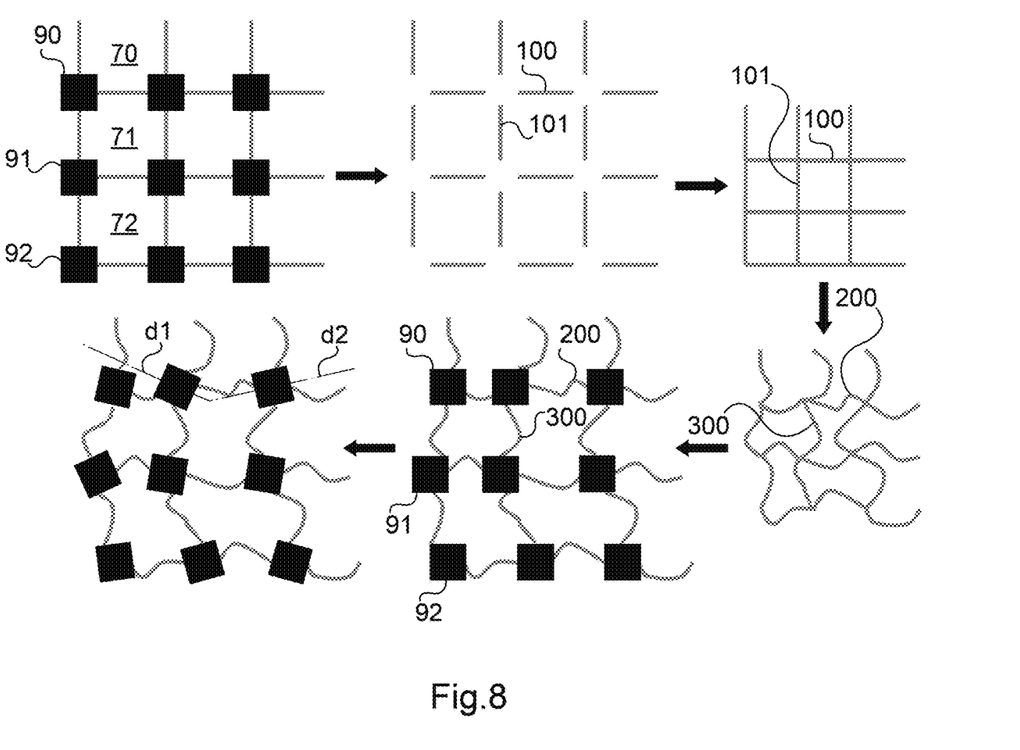
FIG. 8 illustrates an example of a method that has allowed the matrix array of FIG. 3 to be created on the basis of the regular (digital) matrix-array structure of FIG. 2, this FIG. 8 shwoing a schematic top view of the matrix at each step of the method.

An example of a method that has allowed the matrix array of FIG. 3 to be created on the basis of the regular (digital) matrix-array structure of FIG. 2 is shown in FIG. 8.

In a first step defining a first intermediate digital matrix array, transistor blocks 90, 91, 92 . . . , (see FIGS. 2 and 8) are defined, representing the position of each transistor 80, 81, 82 . . . , then, in a second step, they are isolated from the initial active matrix-array structure. Between two horizontally or vertically consecutive transistor blocks lies a straight segment of row 100 or a straight segment of column 101. In a third step, a second intermediate digital matrix array is defined by bringing the straight segments of row 100 and the straight segments of column 101 that link the transistor blocks of the first intermediate digital matrix array closer together.

A fourth step consists in generating disorder in the geometry of the second intermediate digital matrix array obtained beforehand, by moving the nodes thereof and/or by replacing the straight segments 100, 101 between nodes with one or more successive circular arcs 200, 300 respectively.

Figure 5:
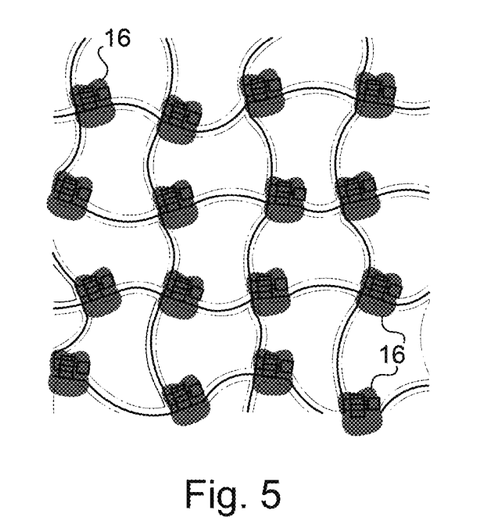
FIG. 5 is a schematic top view of an active matrix array according to the invention, obtained, using a method according to the invention, by deforming the regular matrix-array structure of FIG. 4.
Figure 7:
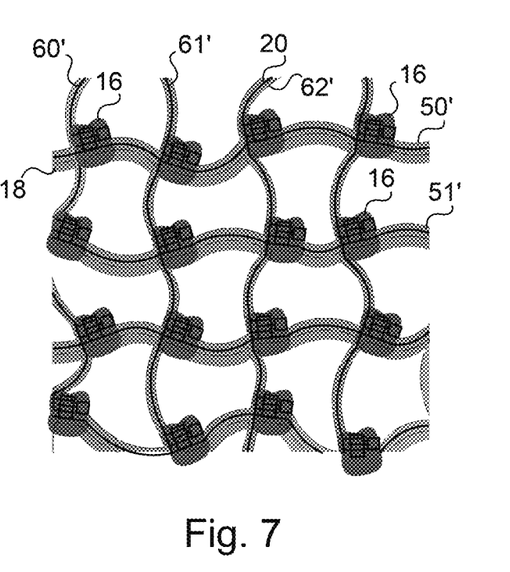
FIG. 7 is a schematic top view of an active matrix array according to the invention, obtained, using a method according to the invention, by deforming the regular matrix-array structure of FIG. 6.

FIGS. 3, 5 and 7 show active matrix arrays thus calculated with a singular circular arc of 60° aperture between two consecutive nodes. Of course, it is possible, and even preferable in terms of distribution of the diffraction but more unfavorable in terms of easiness and rapidity of design and production, to make provision for a plurality of circular arcs on each unitary segment of address row and of data column, and/or to vary the curvatures of the circular arcs from one unitary segment to the next or within a given unitary segment.

Each curved unitary segment 200, 300 (between two consecutive nodes of the obtained deformed network) is then replaced in the first intermediate digital matrix array. It may then be necessary to move certain transistor blocks in order to ensure the connections between the various segments and the transistor blocks.

To finish, optionally, each of the transistor blocks may be pivoted by a random angle comprised between −22.5° and +22.5° in order to generate disorder in the longitudinal directions $d_1$, $d_2$ of the transistors. The inventors have determined that the angular range [−22.5°; +22.5°] is both sufficiently large to obtain a satisfactory attenuation of the diffraction interference due to the transistors and sufficiently narrow to prevent production from being too difficult.

It will be noted that this pseudo-random or random rotation of the transistors is not necessary if the wavelength of the light reaching the matrix is longer than the size of the transistors; it is essentially of interest if the transistors have a size larger than the wavelength or of the order thereof, and in particular if all the dimensions of the transistors, of their gates or electrodes, or those of their shield, are larger than 400 nm.

The digital structure thus defined is an active digital matrix array with optical disorder. In order to meet certain electrical constraints such as the equality, or quasi-equality, of the primary capacitances of the pixels, a procedure for optimizing the position of the transistor blocks may then be implemented in order to decrease deviations, with respect to an average of the areas of the pixels, to a value lower than or equal to 1%. Once again, the curved segments of row 200, 201 and of column 300 are then corrected, if necessary, in order to ensure continuity at the transistor-block level.

Another procedure for optimizing the secondary capacitances may also, as a variant or in combination, be implemented. The secondary capacitance of a pixel is determined by the area of the unitary segment of storage capacitance row that corresponds to the pixel in question. Since the unitary segments of storage capacitance row have different lengths in a deformed matrix according to the invention, the area of said unitary segments varies from one pixel to the next in the case where the storage capacitance row has a constant width. The width of each unitary segment 400, 401 (see FIG. 9, left-hand drawing) may therefore be adjusted so that the areas of the unitary segments are substantially equal for all the pixels, and for example so that the deviations from the average of the areas are smaller than or equal to 1%. As a variant, the width of each unitary segment 400, 401 (see FIG. 9, left-hand drawing) may be adjusted so that the sum of the primary capacitance (area of the pixel) and secondary capacitance (area of the corresponding segment of storage capacitance row) of the pixels varies little, i.e. so that the deviation of this sum from the average, for each pixel, is smaller than or equal to 1% for example.

Figure 9:
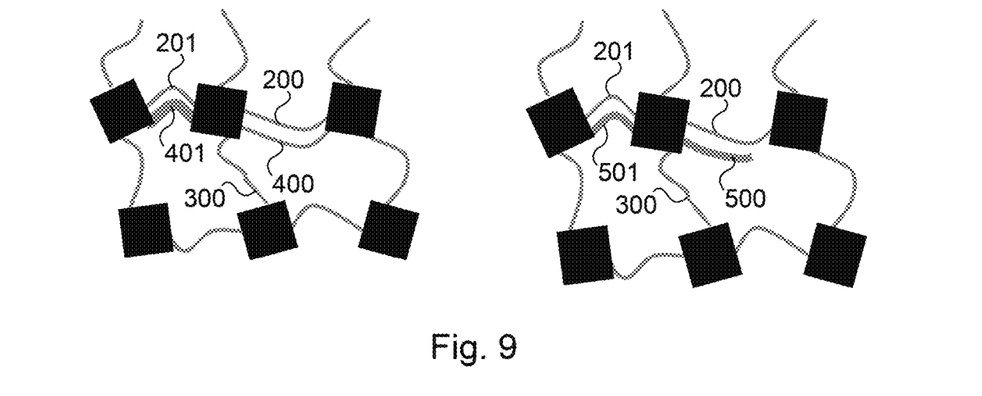
FIG. 9 shows a schematic top view of two matrix arrays according to the invention where the secondary capacitance of a pixel has been optimized in two different ways.

Whether it is a question of the procedure for optimizing the primary capacitances (i.e. the areas of the pixels) or for optimizing the secondary capacitances (i.e. the areas of the unitary segments of the storage capacitance rows 13), it is for example possible to use an optimization algorithm of gradient-descent type that increases area uniformity while minimizing the movement of the nodes with respect to their original position. An example optimization routine operates in the following way for the method for optimizing the areas of the pixels:

The area of each pixel and the average value are calculated.

For each block and for each X and Y direction, the variation in area of all the pixels consecutive to a movement of amplitude "dp" of a transistor is calculated. In fact, only the 4 pixels directly neighboring the block are affected.

The optimization problem may then be written in the form of the following matrix equation in the case of a network of m pixels in X and n pixels in Y:

$$AdX = B \text{ with}$$

$$A = \begin{bmatrix} \Delta\text{area}^{(1,1)}\{dx^{(1,1)}\} & \Delta\text{area}^{(1,1)}\{dy^{(1,1)}\} & \ldots & \Delta\text{area}^{(1,1)}\{dy^{(m,n)}\} \\ \Delta\text{area}^{(2,1)}\{dx^{(1,1)}\} & \Delta\text{area}^{(1,1)}\{dy^{(1,1)}\} & \ldots & \vdots \\ \vdots & \vdots & \ddots & \vdots \\ \Delta\text{area}^{(m,n)}\{dx^{(1,1)}\} & \Delta\text{area}^{(m,n)}\{dy^{(1,1)}\} & \ldots & \Delta\text{area}^{(m,n)}\{dy^{(m,n)}\} \end{bmatrix}$$

$$dX = \begin{bmatrix} dx^{(1,1)} \\ dy^{(1,1)} \\ dx^{(2,1)} \\ dy^{(2,1)} \\ \vdots \\ dx^{(m,n)} \\ dy^{(m,n)} \end{bmatrix}$$

$$B = \begin{bmatrix} \text{area}^{(1,1)} - \text{area}_{average} \\ \text{area}^{(2,1)} - \text{area}_{average} \\ \vdots \\ \text{area}^{(m,n)} - \text{area}_{average} \end{bmatrix}$$

The movement vector dX of a transistor that satisfies the following equations (result given by a computational software package (Matlab, C, Fortran, etc.)) is calculated:

$$\min\left\{\left\|\begin{bmatrix} A \\ Id_{mn} \end{bmatrix} dX - \begin{bmatrix} B \\ 0 \end{bmatrix}\right\|^2\right\}$$

$$\text{where } Id_{mn} = \begin{bmatrix} 1 & 0 & 0 \\ 0 & \ddots & 0 \\ 0 & 0 & 1 \end{bmatrix}$$

Geometrically, this means that the solution that allows the areas to be equalized while moving the transistor blocks as little as possible in the X and Y directions is sought. This operation is repeated as many times as is necessary to obtain a distribution of area of + or −1% about the average value.

Another way of increasing the uniformity of the secondary capacitances consists in replacing the continuous storage capacitance rows with curved segments 500, 501 that are not necessarily connected together but that are of identical length and width from one pixel to the next, as illustrated in the right-hand drawing of FIG. 9.

Thus a matrix array the pixels of which all have the same secondary capacitance is obtained. It is possible to modify the latter earlier on in order to obtain a matrix array the pixels of which all have the same total (primary+secondary) capacitance, for example if the primary capacitances have not been made completely uniform beforehand. Each secondary capacitance may then be adjusted (by adjusting the length, or optionally the width, of the corresponding segment of storage capacitance row) from one pixel to the next so as to compensate for the remaining deviations in the primary capacitances of the pixels.

Other optimization procedures are possible.

Figure 4:
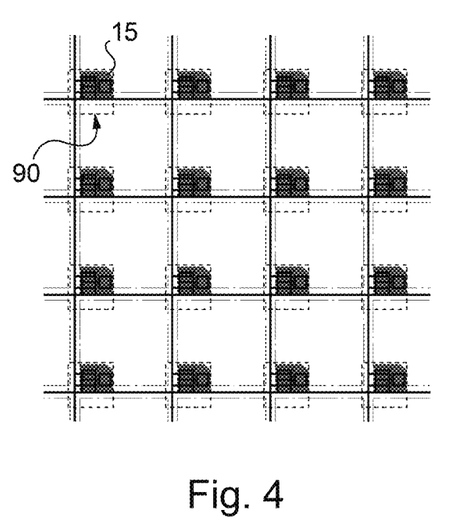
FIG. 4 is a schematic top view of a second example of a conventional regular matrix-array structure of an active matrix array, also of square unit cell and including shields level with the transistors.
Figure 6:
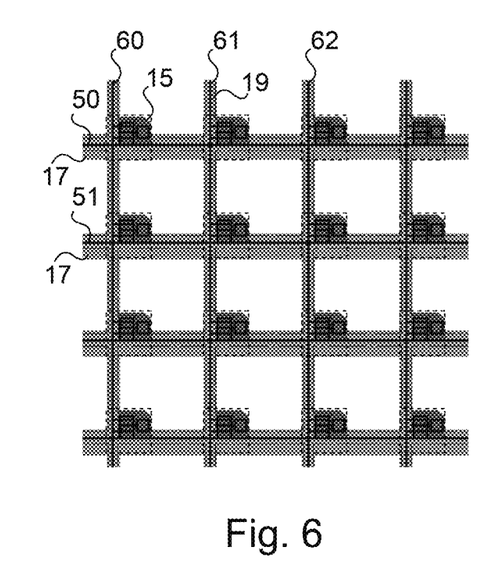
FIG. 6 is a schematic top view of a third example of a conventional regular matrix-array structure of an active matrix array, also of square unit cell and including shields level with the transistors and shadow masks level with the straight address lines and the straight data lines.

FIGS. 4 and 6 show other known regular active matrix arrays, on the basis of which (deformed) active matrix arrays according to the invention, and as illustrated in FIGS. 5 and 7, may be obtained. Only the differences between these matrix arrays and those of FIGS. 2 and 3 described above will be commented on below.

Apart from the elements described above with respect to the matrix array of FIG. 2, the regular active matrix array of FIG. 4 comprises shields 15 masking the transistors of the matrix array. These shields are, in this example, square on the whole with a truncated corner. Such shields engender a diffraction in two main (orthogonal) directions if the dimensions of the shields are larger than or equal to the wavelength of the incident beam. In order to attenuate these effects, the invention recommends not only pivoting the transistor blocks as explained above, but also, as a variant, to use shields having curved outlines with rounded corners like the shields 16 shown in FIG. 5. These shields do not prevent diffraction but distribute it so that its impact on the image is uniform or almost uniform. A perfectly circular shield would uniformly distribute the diffraction directions and would therefore remove the undesirable effects of the diffraction, but would too greatly increase the percentage of opaque material of the matrix array and is therefore undesirable. The shape shown in FIG. 5 is a good compromise.

The regular matrix array illustrated in FIG. 6 in addition comprises shadow masks 17, 19 facing its address rows and data columns, the width of which corresponds substantially to the distance separating two adjacent pixels (in the Y direction and in the X direction, respectively). After transformation according to the invention of a regular digital matrix-array structure that is identical to the matrix array of FIG. 6, a matrix array is obtained (FIG. 7) the curved rows and columns of which are masked by shadow masks 18, 20 that are also curved and that follow the oscillations of the address rows and data columns of the deformed matrix array. The width of the shadow masks may be constant or vary slightly so as to form, once again, undulations that distribute the diffraction directions and thus limit the concentration of diffracted rays in privileged directions.

The invention may encompass many variants of the embodiments described and illustrated above, provided that said variants remain within the scope defined by the appended claims. For example:
- the method according to the invention may apply to matrix-array structures the tiling of which is square, rectangular, rhombus-shaped or hexagonal;
- one or more address rows or data columns may comprise rectilinear sections of various directions, which sections may be successive (for example forming zigzags) or not (i.e. placed between curved sections).

Lastly it will be noted that the invention applies both to active matrix arrays having pixels that are not partitioned (such as the matrix array of FIG. 1) and to active matrix arrays comprising partitioned pixels that are separated by walls (made of polymer for example).

The innovation may be used for any electrically controlled optical function, and in particular for electrochromic digital lenses, or for any ophthalmic lens capable of processing optical information, wherein it is desired to process the amplitude and the optical wave that passes through the component (for example: variation in amplitude, display of information on the lens, treatment of phase (aberration, correction of sight, etc.)).

The invention claimed is:

1. An ophthalmic lens comprising an active matrix array comprising:
   pixels;
   address rows serving to control the pixels, each address row extending between two opposite end terminals, without cutting another row or forming a loop, the address rows being made of a conductive metal material;
   data columns serving to supply the pixels with electrical power, each data column extending between two opposite end terminals, without cutting another column or forming a loop, the data columns being made of a conductive metal material; and
   for each pixel, one or more transistors acting as a switch that allows an electrode specific to the pixel to be electrically connected to a data column associated with the pixel, which switch is controlled via an address row thus associated with the pixel,
   wherein each address row undulates continuously but non-periodically from one side to another side of a straight theoretical address line connecting the two end terminals of the address row,
   wherein each data column undulates continuously but non-periodically from one side to another side of a straight theoretical data line connecting the two end terminals of the data column, and
   wherein the transistors have longitudinal directions that are random or pseudo-random from neighboring transistors.

2. The ophthalmic lens as claimed in claim 1, wherein an absolute value of amplitude of oscillations of each address row, of each data column, respectively, with respect to the corresponding straight theoretical address line is a pseudo-random or random variable having a three-sigma standard deviation lower than or equal to an average period of alternation of the straight theoretical address lines, the average period of alternation being defined as an average spacing between the straight theoretical address lines.

3. The ophthalmic lens as claimed in claim 2, wherein the three-sigma standard deviation of the absolute value of amplitude in the oscillations of each address row, of each data column, respectively, is lower than or equal to half the average period of alternation of the straight theoretical address lines, of the straight theoretical data lines with half the average period of alternation, respectively.

4. The ophthalmic lens as claimed in claim 1, wherein average frequency of oscillations of each address row, of each data column, respectively, is between $\frac{1}{10}$th and 10 times an average frequency at which the address rows, the data columns, respectively, cross the data columns, the address rows, respectively.

5. The ophthalmic lens as claimed in claim 1, wherein at least one address row or data column includes a succession of circular arcs.

6. The ophthalmic lens as claimed in claim 1, wherein the theoretical straight address line, the theoretical straight data line, respectively, of each address row, of each data column, respectively, coincides with an average line of the address row, of the data column, respectively.

7. The ophthalmic lens as claimed in claim 1, wherein the straight theoretical address lines are parallel to one another and the straight theoretical data lines are parallel to one another.

8. The ophthalmic lens as claimed in claim 7, wherein the longitudinal direction of each transistor and/or its shield makes a pseudo-random or random angle between −22.5° and +22.5° to the theoretical straight address line of the address row to which the transistor is connected.

9. The ophthalmic lens as claimed in claim 1, wherein area of the pixels varies with a standard deviation lower than or equal to 5%.

10. The ophthalmic lens as claimed in claim 1, further comprising a shield for each transistor and the shields have longitudinal directions that are random or pseudo-random.

11. The ophthalmic lens as claimed in claim 1, further comprising a shadow mask for each address row or data column.

12. The ophthalmic lens as claimed in claim 1, further comprising, for each address row, a storage capacitance row following the address row, and wherein an area of a unitary section of storage capacitance row extending between two successive data columns has a distribution having a standard deviation lower than or equal to 5%.

13. The ophthalmic lens as claimed in claim 1, wherein the pixels include substances of different refractive indices.

14. The ophthalmic lens as claimed in claim 1, wherein each pixel is closed by walls.

\* \* \* \* \*